US007019755B2

(12) United States Patent
Krueger et al.

(10) Patent No.: US 7,019,755 B2
(45) Date of Patent: Mar. 28, 2006

(54) RENDERING INTENT SELECTION BASED ON INPUT COLOR SPACE

(75) Inventors: Sharon A. Krueger, Pennfield, NY (US); Jean-Pierre R. M. Van de Capelle, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 278 days.

(21) Appl. No.: 10/342,866

(22) Filed: Jan. 15, 2003

(65) Prior Publication Data

US 2004/0135791 A1 Jul. 15, 2004

(51) Int. Cl.
*G09G 5/02* (2006.01)

(52) U.S. Cl. ........................ 345/589; 345/591; 345/593

(58) Field of Classification Search ................. 345/589, 345/591, 593; 358/518
See application file for complete search history.

(56) References Cited

U.S. PATENT DOCUMENTS 5,872,895 A * 2/1999 Zandee et al. .............. 358/518

FOREIGN PATENT DOCUMENTS

| | | |
|---|---|---|
| EP | 0 619 555 A2 | 10/1994 |
| EP | 1 014 687 A2 | 6/2000 |
| EP | 1 152 373 A2 | 11/2001 |
| WO | WO 95/31794 | 11/1995 |

OTHER PUBLICATIONS

Bruce Fraser, Out of Gamut: Realizing Good Intentions with Rendering Intents, Apr. 4, 2001 http://www.creativepro-.com/story/feature/12641.html.

EP 04 00 0526, European Search Report, dated Apr. 15, 2004.

Bruce Fraser, Out of Gamut: Realizing Good Intentions with Rendering Intents, Apr. 4, 2001 htp://www.creativepro.com/story/feature/12641.html.

* cited by examiner

*Primary Examiner*—Kent Chang
*Assistant Examiner*—Chante Harrison
(74) *Attorney, Agent, or Firm*—Fay, Sharpe, Fagan, Minnich & McKee, LLP

(57) ABSTRACT

The invention provides a method for processing a document to be rendered in which rendering intent selection is based on input color space. In one aspect, the method includes the following steps: a) identifying an object type for an object in the document; b) identifying an input color space of the document; c) selecting a rendering intent for the document based on the object type and the input color space; and d) processing the document using the selected rendering intent. In another aspect, the method includes the following steps: a) identifying an object type for each object in the document; b) identifying an input color space of the document; c) selecting a rendering intent for each object in the document based on the object type and the input color space; and d) processing the document using the selected rendering intent(s).

9 Claims, 1 Drawing Sheet

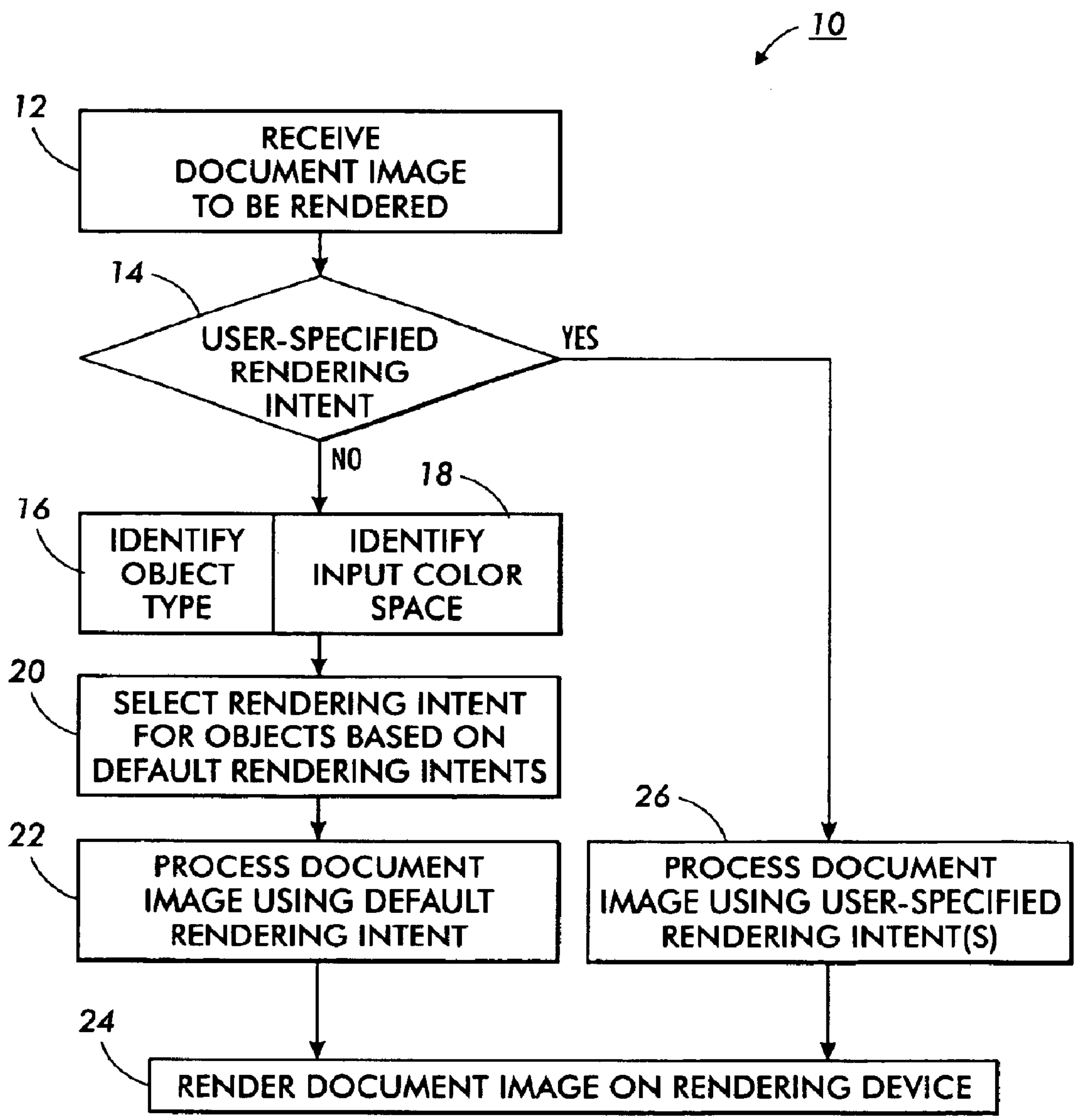
10
12
RECEIVE DOCUMENT IMAGE TO BE RENDERED
14
USER-SPECIFIED RENDERING INTENT
YES
NO
16
IDENTIFY OBJECT TYPE
18
IDENTIFY INPUT COLOR SPACE
20
SELECT RENDERING INTENT FOR OBJECTS BASED ON DEFAULT RENDERING INTENTS
22
PROCESS DOCUMENT IMAGE USING DEFAULT RENDERING INTENT
26
PROCESS DOCUMENT IMAGE USING USER-SPECIFIED RENDERING INTENT(S)
24
RENDER DOCUMENT IMAGE ON RENDERING DEVICE

RENDERING INTENT SELECTION BASED ON INPUT COLOR SPACE

BACKGROUND OF INVENTION

The invention relates to rendering intent selection for document image processing. It finds particular application in conjunction with rendering intent selection based on input color space and will be described with particular reference thereto. However, it is to be appreciated that the invention is also amenable to other applications.

As users of color products become more and more skilled, requirements for control over the image path in a digital front end (DFE) of a image processing system become more pronounced. One example of this is rendering intent selection during image processing of a document image to be rendered. For example, DocuSP 3.0, the Xerox Common Controller/DFE, currently selects rendering intent for document images based on object type.

Rendering intents are simply methods (i.e., sets of rules) for converting colors from one color space to another. They are a standard part of the ICC (International Color Consortium) profile format commonly used in existing color-management systems.

The ICC profile specification defines various rendering intents, including: 1) absolute colorimetric rendering, 2) relative colorimetric rendering, 3) perceptual rendering, and 4) saturation rendering. The rendering intent being used during image processing of a document image defines how colors are mapped from the input color space to the output color space.

Typically, graphics data is processed through the saturation rendering intent to produce vivid output, while images are processed through the perceptual rendering intent to produce true to life pictorials. Such system-specified defaults are available in image processing systems so that users do not need to specify the rendering intent for the document image or for each object type.

Where current mechanisms in color image processing select default rendering intents based on object type, an RGB graphic and a CMYK graphic are rendered through the same rendering intent. This may not always be desirable from the customer perspective.

BRIEF SUMMARY OF INVENTION

Therefore, and as now not existing, to produce optimal image quality, it would be desirable to add a capability in the image processing system to select rendering intent based not only on object type, but also on input color space. For example, image data may be processed so that CMYK graphic data is rendered through a colorimetric rendering intent to preserve the accuracy of colors, while RGB graphic data on the same page is rendered through a perceptual intent to produce a more pleasing output.

Thus, there is a particular need for selection of rendering intent based on input color space. The invention contemplates a method for selection of rendering intent based on input color space that overcomes at least one of the above-mentioned problems and others.

In one aspect of the invention, a method for processing a document to be rendered is provided. The method includes the following steps: a) identifying an object type for an object in the document; b) identifying an input color space of the object; c) selecting a rendering intent for the object based on the object type and the input color space; and d) processing the object using the selected rendering intent.

In another aspect of the invention, a method for processing a document to be rendered is provided. The method includes the following steps: a) identifying an object type for each object in the document; b) identifying an input color space of the document; c) selecting a rendering intent for each object in the document based on the object type and the input color space; and d) processing the document using the selected rendering intent(s).

Benefits and advantages of the invention will become apparent to those of ordinary skill in the art upon reading and understanding the description of the invention provided herein.

BRIEF DESCRIPTION OF DRAWINGS

The invention is described in more detail in conjunction with the accompanying drawing.

FIG. 1 shows a method for selection of rendering intent based on input color space.

DETAILED DESCRIPTION

While the invention is described in conjunction with the accompanying drawing, the drawing is for purposes of illustrating exemplary embodiments of the invention and is not to be construed as limiting the invention to such embodiments. It is understood that the invention may take form in various components and arrangement of components and in various steps and arrangement of steps beyond those provided in the drawings and associated description.

With reference to FIG. 1, a method 10 for selection of rendering intent based on input color space is provided. The method begins when a document image to be rendered is received 12. Next, a determination is made whether the user will specify the rendering intent 14. However, in a system where the user is not permitted to specify the rendering intent, step 14 may be excluded or bypassed. If the user will not specify the rendering intent, object types for objects in the document image are identified 16 and the input color space for the document image is identified 18. Next, a rendering intent is selected for each object in the document image based on system default rendering intents 20. The system default rendering intents are based on input color space and object type. For example, the following table identifies a possible set of system default rendering intents by object type.

| | CMYK | RGB | CIELAB |
|---|---|---|---|
| Text | Relative Colorimetric | Saturation | Saturation |
| Graphics | Relative Colorimetric | Saturation | Saturation |
| Images | Relative Colorimetric | Perceptual | Perceptual |
| Sweeps | Relative Colorimetric | Saturation | Saturation |

Alternative arrangements for default rendering intents are possible, particularly in systems where additional object types and additional input color spaces are available.

After system-specified rendering intents are selected, the document image is processed using the default rendering intents 22. Then, the processed document image is rendered on a rendering device 24.

In step 14, if the user specifies the rendering intent, the user selects the rendering intent(s) and the document is processed using the user-specified rendering intent(s) 26. Then, the processed document is rendered on a rendering device 24.

Implementation of the input color space rendering intent selection is an extension of Xerox's current DocuSP architecture. In this type of architecture, the rendering engine acts as the Color Management Module, and currently selects the rendering intent based on object type. Rendering intent values may be system (default) or user-specified. As a color document is decomposed and rendered, the rendering engine is aware of the input color space of each object in the PDL, and uses this information to further extend the selected rendering intent(s).

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A method for processing a document to be rendered, comprising the following steps:

a) identifying an object type for each object in the document;

b) identifying an input color space for each object in the document;

c) selecting a rendering intent for each object in the document based on the object type and the input color space associated with the corresponding object; and d) processing the document by processing each object using the corresponding selected rendering intent for each object;

wherein the input color space for the objects in the document may differ and, when the input color spaces for the corresponding object types differ the rendering intent selected for the same object types may differ.

2. The method as set forth in claim 1, further comprising the following steps:

e) before step a), determining if a user-specified rendering intent is selected;

f) proceeding to step a) if a user-specified rendering intent is not selected, otherwise processing the document using the user-specified rendering intent.

3. The method as set forth in claim 1, step c) further comprising the following step:

e) for each object where the input color space is CMYK, selecting a relative colormetric rendering intent for the corresponding object.

4. The method as set forth in claim 1, step c) further comprising the following step:

e) for each object where the input color space is RGB and the object type is text, graphics, or sweeps, selecting a saturation rendering intent for the corresponding object.

5. The method as set forth in claim 1, step c) further comprising the following step:

e) for each object where the input color space is RGB or CIELAB and the object type is image, selecting a perceptual rendering intent for the corresponding object and, for each object where the input color space is CMYK and the object type is image, selecting a relative colormetric rendering intent for the corresponding object.

6. The method as set forth in claim 1, step c) further comprising the following step:

e) for each object where the input color space is CIELAB and the object type is text, graphics, or sweeps, selecting a saturation rendering intent for the corresponding object.

7. The method as set forth in claim 1, c) further comprising the following:

e) for each object where the input color space is RGB or CIELAB and the object type is graphic or sweep, selecting a saturation rendering intent for the corresponding object and, for each object where the input color space is CMYK and the object type is graphic or sweep, selecting a relative colormetric rendering intent for the corresponding object.

8. The method as set forth in claim 1, c) further comprising the following:

e) for each object where the input color space is RGB or CIELAB, selecting a first rendering intent for the corresponding object and, for each object where the input color space is CMYK, selecting a second rendering intent for the corresponding object.

9. The method as set forth in claim 1, c) further comprising the following:

e) for each object where the input color space is RGB, selecting a first rendering intent for the corresponding object and, for each object where the input color space is CIELAB, selecting a second rendering intent for the corresponding object.

* * * * *